Figure 1A:
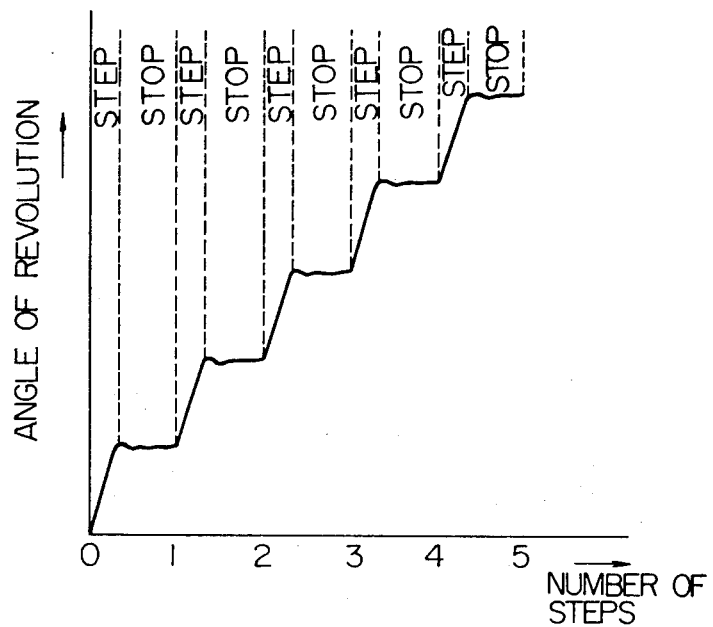

United States Patent [19]

Inaba et al.

[11] 3,757,193
[45] Sept. 4, 1973

[54] CIRCUIT FOR DRIVING THE PULSE MOTOR

[75] Inventors: Seiuemon Inaba; Kanryo Shimizu, both of Kawasaki; Toshio Kojima, Yamato, all of Japan

[73] Assignee: Fujitsu Limited, Kanagawa-ken, Japan

[22] Filed: July 1, 1971

[21] Appl. No.: 158,831

[30] Foreign Application Priority Data
July 6, 1970 Japan................................ 45/58877

[52] U.S. Cl.................. 318/696, 318/440, 318/685, 318/434
[51] Int. Cl. .......................................... H02k 37/00
[58] Field of Search..................... 318/696, 685, 254, 318/138, 432, 434, 440

[56] References Cited
UNITED STATES PATENTS 3,560,821 2/1971 Beling................................ 318/138
3,452,263 6/1969 Newell............................... 318/696
3,355,646 11/1967 Goto.................................. 318/138
3,424,961 1/1969 Leenhouts......................... 318/696

Primary Examiner—G. R. Simmons
Attorney—Nelson E. Kimmelman et al.

[57] ABSTRACT

The circuit for driving the pulse motor applies a high voltage to the exciting coil of the pulse motor when the rotor of the pulse motor rotates. The current of the exciting coil is detected in the detector circuit, and when said current reaches a predetermined valve, said high voltage applied to the exciting coil changes to a low voltage. That is, the circuit of the application is composed of a high voltage source, a low voltage source, a detector circuit, and circuit for changing from said high voltage source to said low voltage source.

4 Claims, 8 Drawing Figures

CIRCUIT FOR DRIVING THE PULSE MOTOR

The present invention relates to a circuit for driving a pulse motor, and especially relates to a circuit which applies a high voltage to a pulse motor when the rotor revolves, and applies a low voltage to the pulse motor when the rotor is in its stopped condition.

Generally, the pulse motor repeats the movement and the stop by control from the input control signal, then rotates to the predetermined angle in a step manner. Now, the mechanical work of the pulse motor, that is the power, is used only when the rotor of the pulse motor is actually moving. Accordingly, it is preferable that the high voltage of the input electric power is supplied only when the rotor is moving, and a low voltage is supplied when the rotor is stopped.

The conventional method which realizes this purpose uses a series resistor to change the value of the current flowing in the exciting coil of the pulse motor. However, this method has the defect that the electric power loss in the series resistor is considerable and thus high efficiency can not be expected. Another method exchanges the high voltage source with the low voltage source in a predetermined fixed period. However, the circuit realizing this method is very complex, because the current flow in the exciting coil increases exponentially so that the setting of the commutation time in a high speed operation is very difficult.

The object of the present invention is to overcome the above-mentioned drawbacks.

A further object of the present invention is to provide a circuit which detects an exciting current in the exciting coil and when said exciting current reaches a predetermined value, the voltage source is changed from high to low.

A still further object of the present invention is to provide a circuit having excellent efficiency and reliability.

Further features and advantages of the present invention will be apparent from the ensuing description with reference to the accompanying drawings to which, however, the scope of the invention is in no way limited.

Figure 1B:
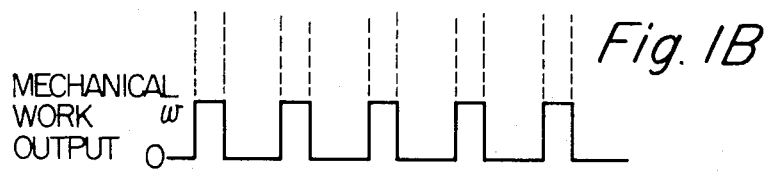
Figure 1C:
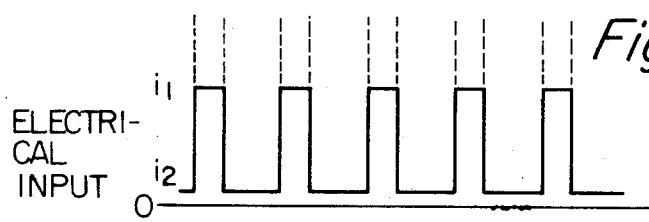
Figure 2A:
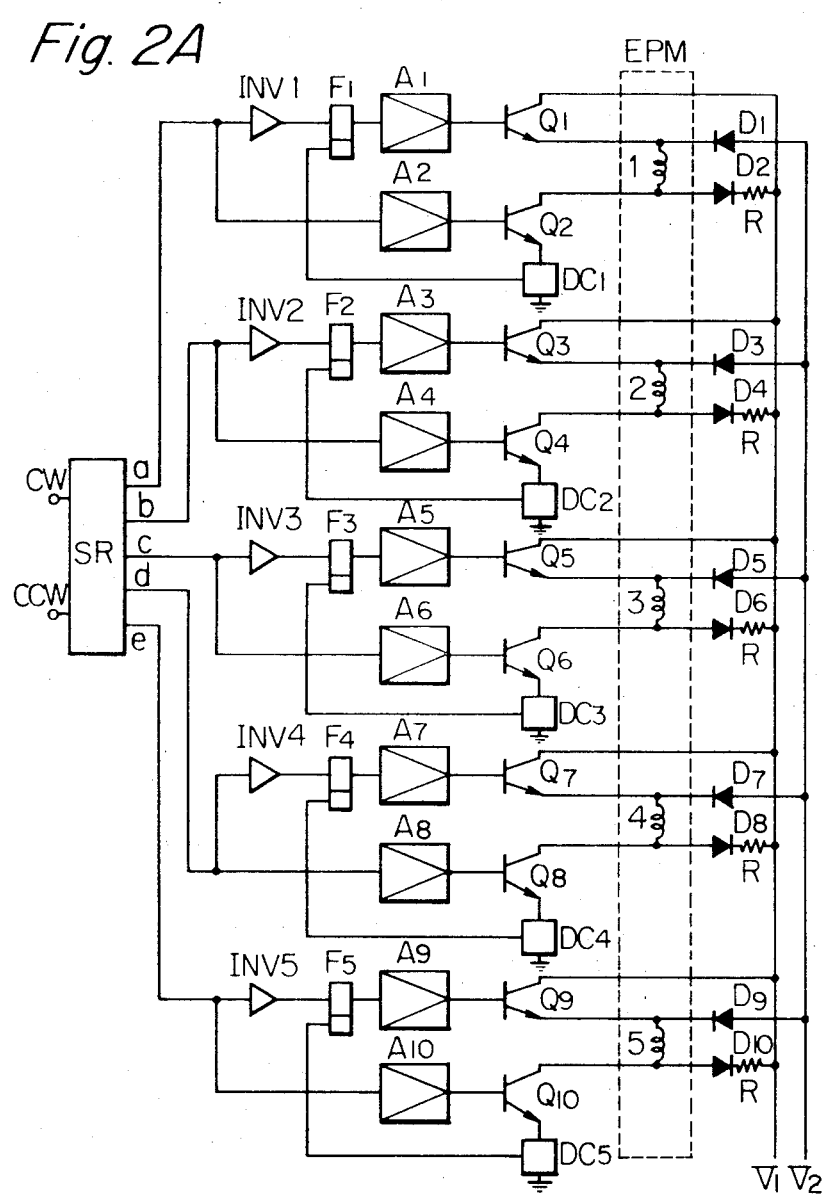
Figure 2B:
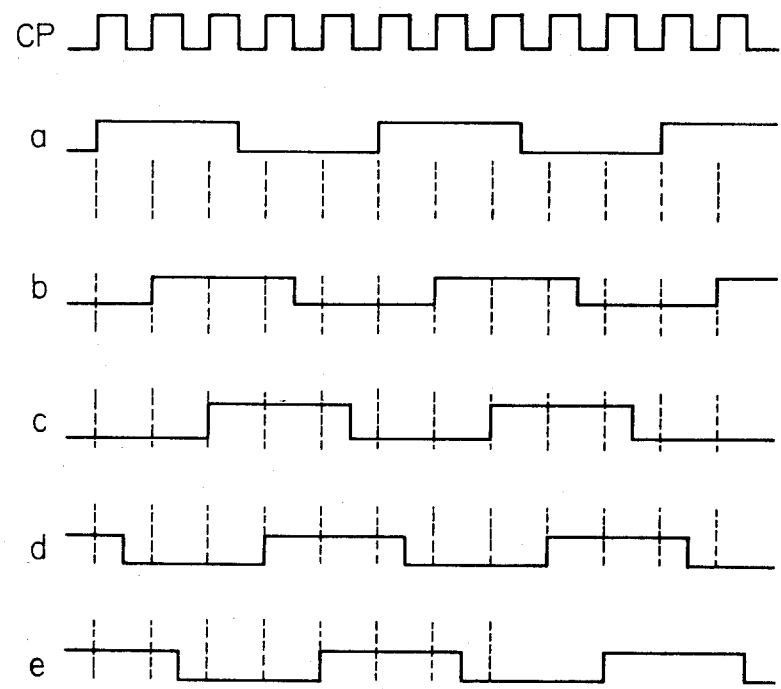
Figure 3A:
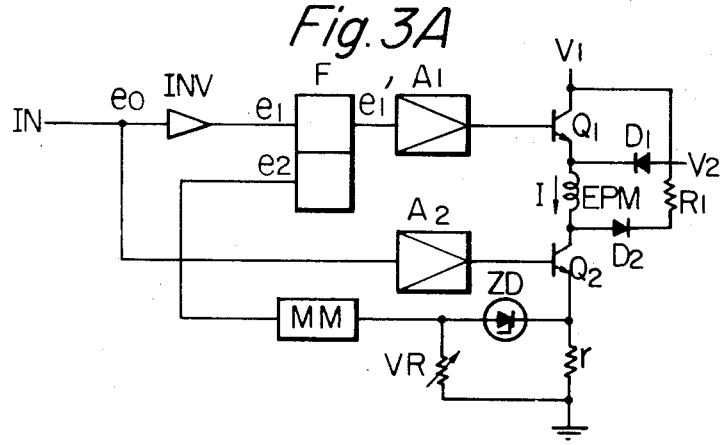
Figure 3B:
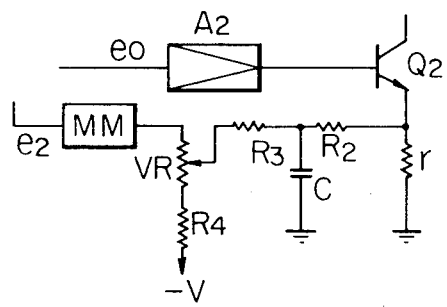
Figure 4:
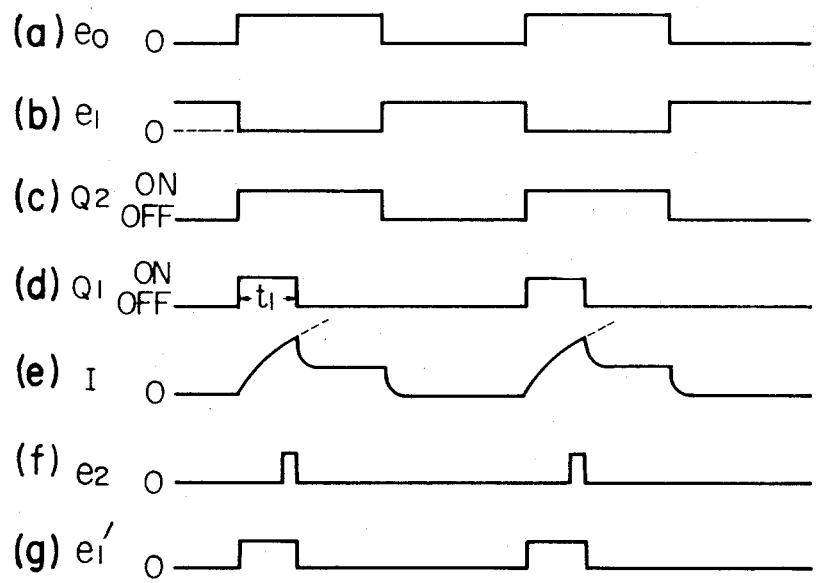

FIGS. 1A to 1C are diagrams and waveforms explaining the function of the pulse motor, FIGS. 2A and 2B are respectively block diagram and waveforms of one embodiment of the present invention, FIGS. 3A and 3B are schematic driving circuits relating to one phase of the pulse motor, and FIG. 4 is a diagram showing the waveforms at the essential points of FIG. 3.

Referring to FIG. 1A, the pulse motor repeats a step and a stop under the control of the input control signal and revolves through a predetermined angle in a step manner. Thus the mechanical work, that is the output of the pulse motor, is produced pulsatingly as shown in FIG. 1B. Accordingly, the efficiency of the pulse motor can be considerably increased by providing the input electric power in an impulse manner as shown in FIG. 1C. That is, the current $i_2$ is drawn during the period that the rotor is stopped and the current $i_1$ is drawn during the period that the rotor rotates from one magnetic stable point to another magnetic stable point, and does work.

FIG. 2A is one example of the embodiment of the driving circuit of a five-phase pulse motor EPM. The exciting coils 1 – 5 of each phase are connected respectively to two transistors actuated as switching elements. One of said transistors is connected to the high voltage source $V_1$ and is provided as the high voltage switch. The other of said transistors is connected to the low voltage source $V_2$ via the exciting coil and a diode. The detecting circuits DC1 to DC5 detect the exciting current in the exciting coils, and when the exciting currents reach a predetermined value, the flip-flops F1 to F5 reset and the high voltage switch transistors $Q_1$, $Q_3$, $Q_5$, $Q_7$ and $Q_9$ cut-off and the low voltage source $V_2$ is applied to the exciting coils.

Referring to FIG. 2A, the command pulse CP as shown in FIG. 2B is applied to a positive direction terminal CW or a negative direction terminal CCW of the two phase-three phase alternative exciting control circuit SR. The exciting control circuit SR then distributes the control signals from its output terminals ($a - e$) as shown in FIG. 2B so as to repeat alternatively the two phase excitation and the three phase excitation in the predetermined phase order. These control signals are supplied to the driving circuit of the pulse motor.

FIG. 3A shows a driving circuit diagram of one phase of a poly-phase electric pulse motor. Referring to FIG. 3A, a coil EPM of an electric pulse motor is connected via a transistors $Q_1$ and $Q_2$ and a resistor r to a high voltage electric source $V_1$, and a low voltage electric source $V_2$ is connected via a diode $D_1$ to a connection point between the emitter of the transistor $Q_1$ and the coil EPM of the electric motor, and a connection point between the coil EPM and the collector of the transistor $Q_2$ is connected via a diode $D_2$ and a resistor $R_1$ to the high voltage potential. The input terminal IN is connected to an inverter INV, the output of the inverter is connected to a set terminal of a flip-flop circuit F, and the output of the flip-flop circuit F is connected via an amplifier $A_1$ to the base of the transistor $Q_1$. Also, the input terminal IN is connected via an amplifier $A_2$ to the base of the transistor $Q_2$. This constitutes the changing circuit. The series circuit consisting of a Zener diode ZD and a variable resistor VR is connected to both terminals of the resistor r, and the connection point between the Zener diode ZD and the variable resistor VR is connected via a mono-stable circuit MM to the reset terminal of the flip-flop circuit F. As mentioned above, this constitutes the detecting circuit of the exciting current.

On the one hand, when an input signal $e_o$ as shown in (a) of FIG. 4 is applied to the input terminal IN, said signal $e_o$ is supplied to the base of the transistor $Q_2$ and said transistor $Q_2$ is made to conduct. On the other hand, said input signal $e_o$ is inverted by the inverter INV, and the inverted signal $e_1$ as shown in (b) of FIG. 4 is applied to the set terminal of the flip-flop F. The falling time in the leading edge of the signal $e_1$ sets the flip-flop F and an output $e_1'$ of the flip-flop F as shown in (g) of FIG. 4 is supplied via the amplifier $A_1$ to the base of the transistor $Q_1$, and the transistor $Q_1$ conducts. As a result of this, the current I as shown in (e) of FIG. 4 flows from the high voltage source $V_1$ through exciting coil EPM. This current I increases exponentially due to the inductance of the exciting coil EPM, as shown in (e) of FIG. 4. The increase in value of the current I is detected as the voltage drop across the resistor r. The variable resistor VR is adjusted so that the current detected by the resistor r rises above the voltage of the Zener diode ZD and is applied to the mono-stable multivibrator MM when said current reaches the predetermined value. Then the voltage $e_2$ of the mono-stable multivibrator MM shown (f) in FIG. 3 which exceeds the voltage of the Zener diode ZD is applied to the reset terminal of the flip-flop F, and the falling edge of the signal $e_2$ puts the flip-flop F into the reset state so that the output pulses $e_1'$ of the flip-flop F fall to zero as shown in (g) of FIG. 4. Accordingly, the transistor $Q_1$ is cut-off. However, the transistor $Q_2$ is maintained in the "on" state, and the current flows from the low voltage source $V_2$ through exciting coil EPM via the diode $D_1$. Then the current I decreases as shown in (e) of FIG. 4. Another embodiment of the detecting circuit is shown in FIG. 3B. In this circuit, an input trigger level of the mono-stable multivibrator MM is fixed at a predetermined level by the variable resistor VR, a resistor $R_4$ and a bias voltage $-V$. When the voltage drop in the resistor $r$ exceeds said predetermined level, said voltage is applied via resistors $R_2$, $R_3$ and a capacitor C to the monostable multivibrator MM. And the output $e_2$ of the mono-stable multivibrator MM shown in (f) of FIG. 4 is applied to the reset terminal of the flip-flop circuit F. A counter electromotive force is produced in the exciting coil by said sudden decrease of the current I, and, said force is fed back to the high voltage source $V_1$ via the diode $D_2$ and the resistor $R_1$. Next, the input signal $e_o$ falls to zero, and the transistors are both cut-off, and the current passing through the exciting coil EPM falls to zero.

The conduction time $t_1$ of the transistor $Q_1$ which is connected between the exciting coil EPM and the high voltage potential $V_1$ is selectively determined by the values of the resistor $r$, the voltage of the Zener diode ZD and the variable resistor VR. However, said conduction time $t_1$ must be determined taking into consideration the moment of inertia of the pulse motor which includes the mechanical load, and self inductance of the exciting coil. Further, the variable resistor VR is provided for adjusting precisely the said conduction time $t_1$.

As mentioned above, according to the driving circuit for the electric pulse motor of the present invention, a rapid rise edge of the exciting current and a rapid response time can be expected, and the electric power loss can be reduced by controlling the exciting current to its predetermined value. Further, the transistors used for the switching elements will not deteriorate due to excessive current, because even in the case where a layer short-circuit occurs in the exciting coils of the pulse motor, the detecting circuit detects the current and commutates to the low voltage source. Further, the current supplied by the high voltage source is maintained constant, then the torque is maintained in constant both at low and high speeds.

It is understood that other current detecting means, such as, for example the hole effect, can be utilized as the current detecting circuit, and the switching element and the gate circuit except for the transistors can be utilized as the commutating circuit.

What is claimed is:

1. A circuit for driving a multiphase pulse motor in response to a control signal from a generator therefor comprising for each phase of said motor:

an exciting coil, means including a first switching element for coupling with a first terminal of said coil to a high voltage source, means for coupling said first terminal to a low voltage source, a second switching element coupled between a second terminal of said coil and a reference potential, a signal path coupled between said generator and said first switch element which includes means for controlling said first switching element, a changing circuit coupled between said generator and said second switching element for controlling said second switching element, and a detector circuit coupled between said means for controlling said first switching element and said second switching element, said signal path and said changing circuit initially causing said first and second switching elements to be conductive in response to the beginning of said control signal, whereupon an exciting current flows solely from said high voltage source through said coil, thereby decoupling said low voltage source from said first terminal thereof, until it reaches a predetermined value at which said detector circuit causes said controlling means in said signal path to cut off said first switching element, which thereby cuts off the current from said high voltage source whereupon said coil is traversed solely by current from said low voltage source until the end of said control signal at which time said second switching element is cut off and said low voltage current no longer flows through said coil.

2. The circuit according to claim 1 wherein said first and second switching elements are solid-state transistors whose collectors and emitters are in series with said coil.

3. The circuit according to claim 1 wherein said signal path includes means responsive to said control signal for producing a pulse having a duration shorter than the duration of said control signal thereby to render said first switching element conductive for a time shorter than said second switching element.

4. The circuit according to claim 1 wherein said detector circuit includes voltage-level sensing means and a monostable multivibrator for producing a sharp pulse which, when applied to said signal path causes the controlling means therein to terminate the signal produced therein which renders said first switching element conductive.

* * * * *